(No Model.)
J. P. WELLER.
TIRE SETTER.
No. 276,944.   Patented May 1, 1883.
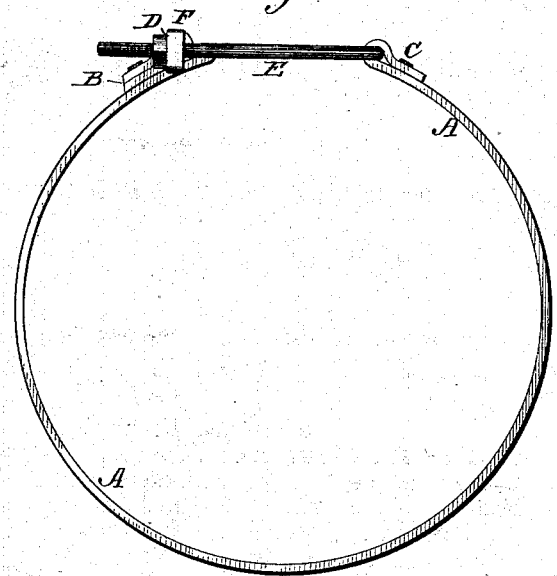
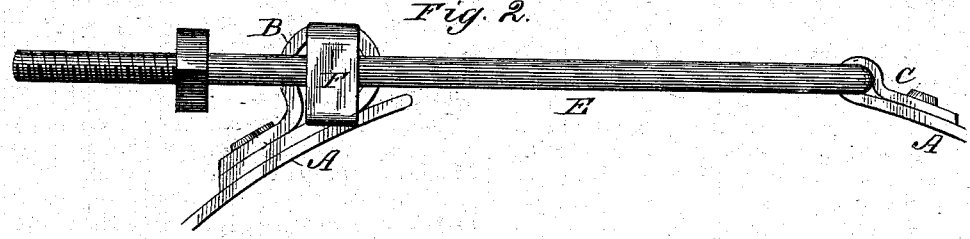
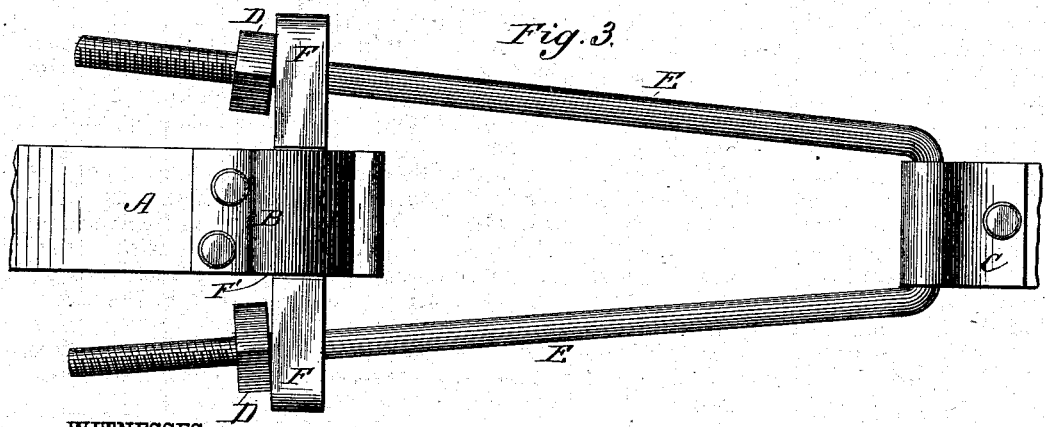
WITNESSES:
INVENTOR:
ATTORNEYS.

UNITED STATES PATENT OFFICE.

JACOB P. WELLER, OF ST. LOUIS, MISSOURI.

TIRE-SETTER.

SPECIFICATION forming part of Letters Patent No. 276,944, dated May 1, 1883.

Application filed October 28, 1882. (No model.)

*To all whom it may concern:*

Be it known that I, JACOB P. WELLER, a citizen of the United States, residing in the city of St. Louis and State of Missouri, have invented a new and Improved Tire-Setter, of which the following is a specification.

The object of my invention is to provide means whereby tires which are open at one or more points in their circumference may be stretched upon their wheels tightly, and so held while the ends are properly joined and secured in place.

To this end my invention consists in the construction and combination of parts forming a tire-setter, hereinafter fully described and claimed, reference being had to the accompanying drawings, in which—

Figure 1 is a side elevation of my invention. Fig. 2 is a side elevation of the joint, and Fig. 3 is a plan of the same.

A represents a metallic band, provided with a hinge-block, B, riveted on its outer face at a little distance from one end, and with a similar block at the other end, or with a loop, C, formed in the end by turning the band back and riveting it upon itself. In this loop C the cross-bar of a staple, E, turns freely. The two ends of this staple E are screw-threaded and provided with nuts D.

F is a cross-bar, made cylindrical along its body F' to turn freely in the block B, and provided with broad flat heads at each end of said body. Through these two heads are holes adapted to admit the two arms of the staple E and permit the same to slide freely. The nuts D are screwed on the ends of the two arms of the staple E, behind the cross-bar F.

In practice the band A is placed around the tire upon the wheel with the opening of staple C over the joint of the tire. Then the nuts are screwed up until the tightening of the band around the wheel draws the ends of the tire to the desired place. By means of this staple C an opening is formed in the circumference of the band, through which joining-bolts may be introduced into the tire and through which any other work may be done upon the joint of the tire while the tire is drawn together and held by said band.

This tire-setter is especially designed for use in setting the tires of my vehicle-wheel, for which an application for a patent is filed of even date herewith, yet it is adapted for use with any tire which requires to be joined after being placed on the wheel.

I am aware that bands have before been used for setting tires on wheels, and I do not claim the same, broadly, as my invention; but

What I claim, and wish to secure by Letters Patent, is—

The combination, with the band A, of the block B, firmly secured to one end thereof, the biperforated cross-bar F, turning freely in said block, the staple E, provided with screw-threads on its two ends, passing freely through the two holes in said cross-bar F, the screw-nuts D thereon, and the loop C at the other end of the band A to hold the cross portion of the staple, as and for the purpose specified.

JACOB P. WELLER.

Witnesses:
W. X. STEVENS,
SOLON C. KEMON.